United States Patent [19]

Kronberg

[11] Patent Number: 5,314,735
[45] Date of Patent: May 24, 1994

[54] SURFACE COATING FOR PREVENTION OF CRUST FORMATION

[75] Inventor: James W. Kronberg, Aiken, S.C.

[73] Assignee: The United States of America as represented by the United States Department of Energy, Washington, D.C.

[21] Appl. No.: 730,423

[22] Filed: Jul. 16, 1991

[51] Int. Cl.⁵ .............................................. B32B 3/12
[52] U.S. Cl. ..................... 428/116; 428/71; 428/72; 428/73; 428/117; 428/118; 428/213; 428/218; 428/220; 428/247; 428/255; 428/421
[58] Field of Search ............... 428/116, 117, 118, 72, 428/73, 71, 247, 255, 212, 213, 40, 421, 480, 354, 317.3, 218; 220/400, 402

[56] References Cited

U.S. PATENT DOCUMENTS

| | | | |
|---|---|---|---|
| 2,061,569 | 11/1936 | Fischer | 428/116 |
| 2,930,677 | 3/1960 | Van Loenen | 23/143 |
| 2,934,235 | 4/1960 | Maneri | 220/64 |
| 2,956,915 | 10/1960 | Korn | 154/43 |
| 2,970,042 | 2/1957 | Lagerwey | 23/290 |
| 3,236,688 | 2/1966 | Kahn | 134/4 |
| 3,687,087 | 8/1972 | Yurkoski et al. | 105/355 |
| 3,738,527 | 6/1973 | Townsend | 220/63 |
| 4,136,222 | 1/1979 | Jonnes | 428/116 |
| 4,382,106 | 5/1983 | Royster | 428/116 |
| 4,606,955 | 8/1986 | Eastman | 428/116 |
| 4,785,967 | 11/1988 | Christen | 220/400 |
| 5,039,567 | 8/1991 | Landi | 428/116 |
| 5,116,689 | 5/1992 | Castro | 428/117 |
| 5,180,619 | 1/1993 | Landi | 428/116 |

Primary Examiner—Ellis P. Robinson
Assistant Examiner—Nasser Ahmad
Attorney, Agent, or Firm—Brian R. Tumm; Harold M. Dixon; William R. Moser

[57] ABSTRACT

A flexible surface coating which promotes the removal of deposits as they reach the surface by preventing adhesion and crust formation. Flexible layers are attached to each side of a flexible mesh substrate comprising of a plurality of zones composed of one or more neighboring cells, each zone having a different compressibility than its adjacent zones. The substrate is composed of a mesh made of strands and open cells. The cells may be filled with foam. Studs or bearings may also be positioned in the cells to increase the variation in compressibility and thus the degree of flexing of the coating. Surface loading produces varying amounts of compression from point to point causing the coating to flex as deposits reach it, breaking up any hardening deposits before a continuous crust forms. Preferably one or more additional layers are also used, such as an outer layer of a non-stick material such as TEFLON, which may be pigmented, and an inner, adhesive layer to facilitate applying the coating to a surface.

12 Claims, 2 Drawing Sheets

SURFACE COATING FOR PREVENTION OF CRUST FORMATION

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to surface coatings. In particular, the present invention relates to a flexible coating for preventing the build-up of solids deposited on a surface.

1. Discussion of Background

In many situations, the buildup of a hardening slurry, of a cooling and solidifying liquid or of precipitated matter on an exposed surface can lead to the formation of an unwanted hard crust. Examples include the buildup of hardening cement on the interior wall of a cement mixer, of automotive paint on spraying racks, of pipe scale in boilers and water-treatment vessels, and of ice on porch steps or on the wings of an aircraft. Such a crust can be difficult to remove without damaging the underlying surface, and can interfere with functioning and create safety hazards.

The surfaces of equipment used in some chemical processes can be coated with a waxy material which melts when the equipment is heated. Surface deposits are thereby loosened and can be removed. See Kahn (U.S. Pat. No. 3,236,688). Corrosion-resistant coatings are available for the inner surfaces of railroad freight cars, storage tanks, and process equipment. See, for example, Townsend (U.S. Pat. No. 3,738,527), Korn et al. (U.S. Pat. No. 2,956,915), Maneri (U.S. Pat. No. 2,934,235), and Van Loenen (U.S. Pat. No. 2,930,677). Railroad freight cars can be lined with resilient insulating material to dissipate some of the energy created by localized forces. See Yurkoski (U.S. Pat. No. 3,687,087).

In some cases, surface deposits can be easily removed using temporary, flexible materials. For example, when spraying concrete onto a surface where overspray onto adjacent surfaces must be avoided, polyethylene sheets are used to mask the adjacent area. Upon the completion of spraying, the sheets are flexed and the hardened concrete deposits break and fall off. However, hard surfaces such as metal, wood or masonry cannot be flexed in this way to clear them of surface deposits. Furthermore, there is no surface coating which actively prevents adhesion and crust formation on surfaces.

SUMMARY OF THE INVENTION

According to its major aspects and broadly stated, the present invention is a flexible surface coating or laminate for preventing adhesion and crust formation. The coating comprises a flexible substrate having a multiplicity of strands and open cells forming a mesh, and one or more flexible layers bonded to the substrate that, together, form a coating having numerous small, adjacent zones, each zone having a different compressive strength. Surface loading produces compression loadings that vary from point to point, so that the coating flexes as deposits reach it. This flexing breaks up any hardening deposits as they are deposited but before a continuous crust forms. The cells may be filled with a resilient, compressible foam, and studs or bearings may be positioned in the cells to increase further the variation in compressibility and thus the degree of flexing of the coating. Additional layers may be added to the outer or inner layer, or both, to add properties to the coating. The coating is strong yet light in weight and can be tailored to the expected properties of the crust-forming material.

An important feature of the present invention is the zone-to zone variation in compressibility of the flexible substrate. By varying the composition of the cells to achieve variations in compressibility, zones of one or more cells are created that respond differently to the impact of the deposits. As a result, the substrate flexes in response to the deposits as they land on the surface. The materials of the substrate and the dimensions of the cells are chosen to provide the degree of flexing which best prevents the formation of a crust by surface deposits in the environment of use.

Another feature of the present invention are the additional, flexible layers. The properties of the coating may be modified by adding layers with certain properties. For example, an outer layer of a non-stick material such TEFLON would prevent the sticking of surface deposits, and an outer pigmented or slightly textured layer would modify the appearance of the coating or enhance its survival in sunlight. The inner layer could incorporate a pressure sensitive adhesive, protected against adhering until needed by a peel-off backing, to simplify attachment of the coating to the surface to be protected. The materials are chosen to provide the toughness and withstand the expected environmental conditions dictated by the application and yet provide the degree of flexing which best prevents the formation of a crust by surface deposits.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
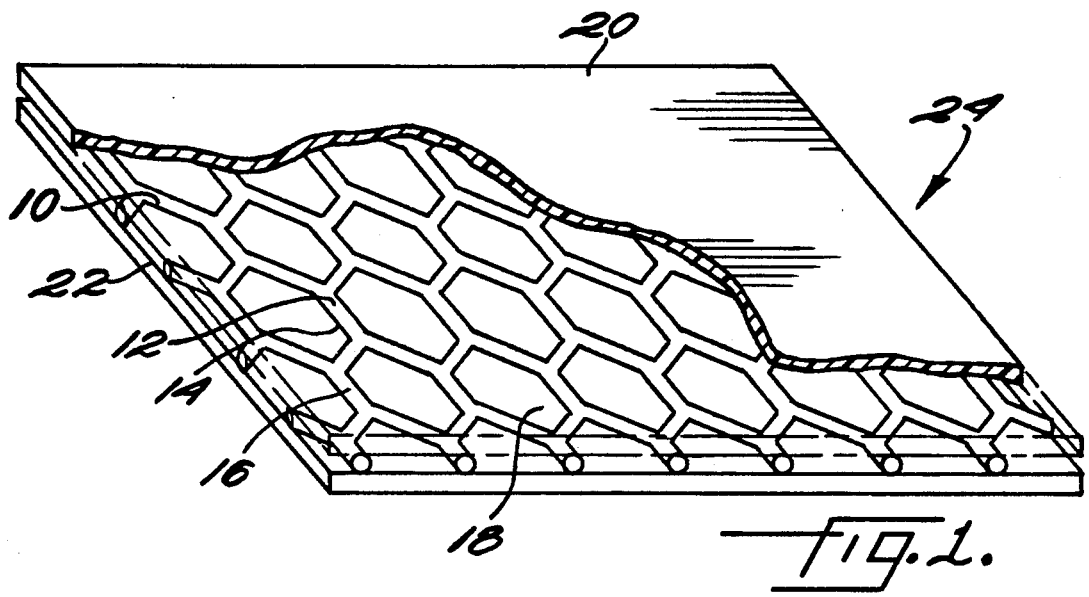
FIG. 1 is a perspective view of a flexible coating according to a preferred embodiment of the present invention.

Referring to FIG. 1, there is shown a flexible coating 24 according to a preferred embodiment of the present invention. Flexible coating 24 comprises a flexible mesh substrate 10 with an outer side 12 and an inner side 14 and possibly one or more outer layers to be described in detail below. Substrate 10 comprises in turn a plurality of strands 16 and open cells 18. Strands 16 may be made of fiber, molded or extruded plastic, wire, or other material or combination of materials. Cells 18 are preferably closed and most preferably hexagonal. The diameter of cells 18 is preferably between 3 and 10 times their depth, which is preferably approximately equal to the diameter of strands 16. Mesh 10 could be made, for example, by dipping hexagonal steel mesh such as chicken wire into a flexible plastic resin. The materials and exact dimensions of mesh 10 reflect the intended application, and are determined by a modest amount of experimentation by those of ordinary skill in each application.

Figure 2A:
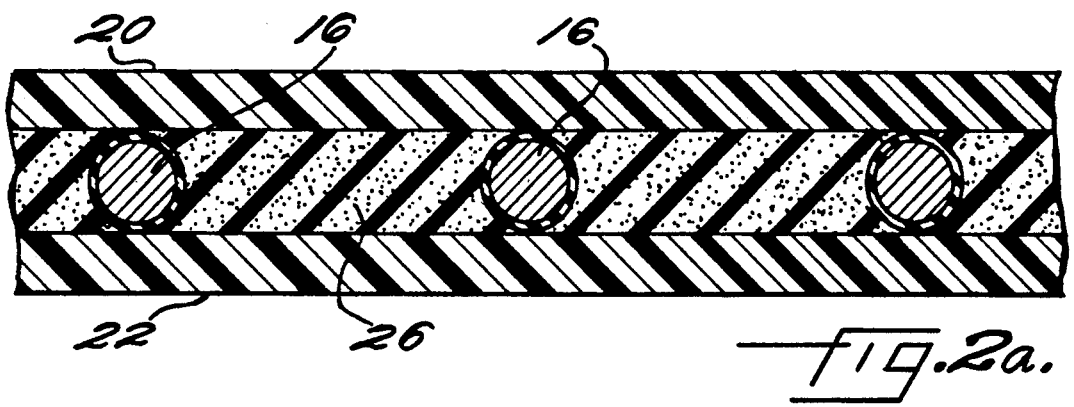
FIG. 2a is a cross-sectional view of the coating of FIG. 1.

Flexible outer layer 20 is attached to outer side 12 of mesh 10 by welding, cementing or other means. Flexible inner layer 22 is attached to inner side 14 of mesh 10, sealing cells 18 and forming coating 24. Alternatively, cells 18 are filled with resilient filling 26, as shown in FIG. 2a. Filling 26 can be a compressible foam or some other convenient material which is more compressible than strands 16. Filling 26 also adds to the mechanical strength of coating 24, and may provide thermal and acoustic insulation. Coating 24 thus has numerous small, adjacent zones composed of one or more cells, each zone having a different compressive strength than its neighboring zones. As deposits impact on coating 24, the variations in compressibility from zone to zone cause coating 24 to flex. The flexing helps to prevent the crust from adhering and causes cracks to form in the deposits to break them up.

Figure 2B:
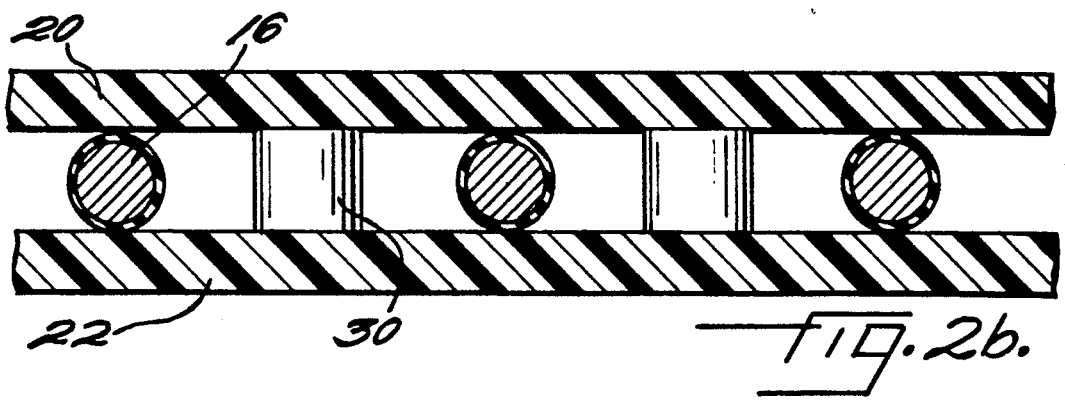
FIG. 2b is a cross-sectional view of a flexible coating according to an alternative embodiment of the present invention.

Noncompressible members 30, such as metal studs or bearings, may also be placed in cells 18, as shown in FIG. 2b. Alternatively, members 30 are attached to mesh 10, or layers 20 or 22, before sealing. Members 30 increase the variation in compressibility and thus the amount of flexing of coating 24. Members 30 facilitate the breaking-up of crusts formed by surface deposits, such as ice on steps and walkways, by providing sites for crack formation.

Layers 20 and 22 are made of some tough but flexible material such as polyvinyl chloride, polyester (MYLAR), polyimide (KAPTON), or the like. Additional layers may be added to either outer layer 20 or inner layer 22 of coating 24, or both, to add to or modify its properties. For example, outer layer 20 might be a non-stick material such TEFLON to promote the release of surface deposits, and might also include a pigmented layer or possibly a textured layer to modify the appearance of coating 24 or enhance its survival in sunlight. Similarly, inner layer 22 might incorporate a pressure sensitive adhesive, protected until needed by a peel-off backing, to enable coating 24 to adhere to the surface to be protected. Other combinations are also possible within the scope of the present invention.

The materials and exact dimensions of layers 20 and 22, filling 26, and members 30 are chosen to withstand the expected environmental conditions and provide the degree of flexing which best prevents the formation or adhesion of a crust.

Figure 3A:
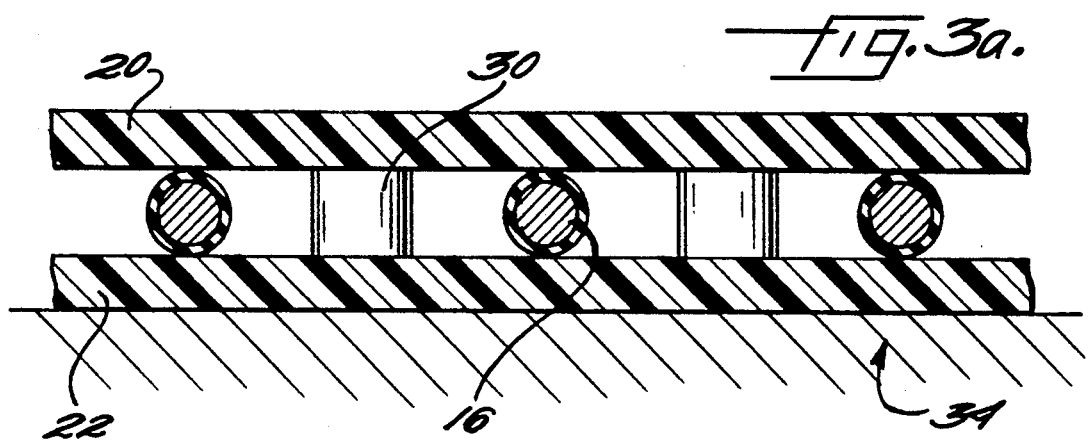
FIG. 3a is a cross-sectional view of a surface furnished with a flexible coating according to the present invention.
Figure 3B:
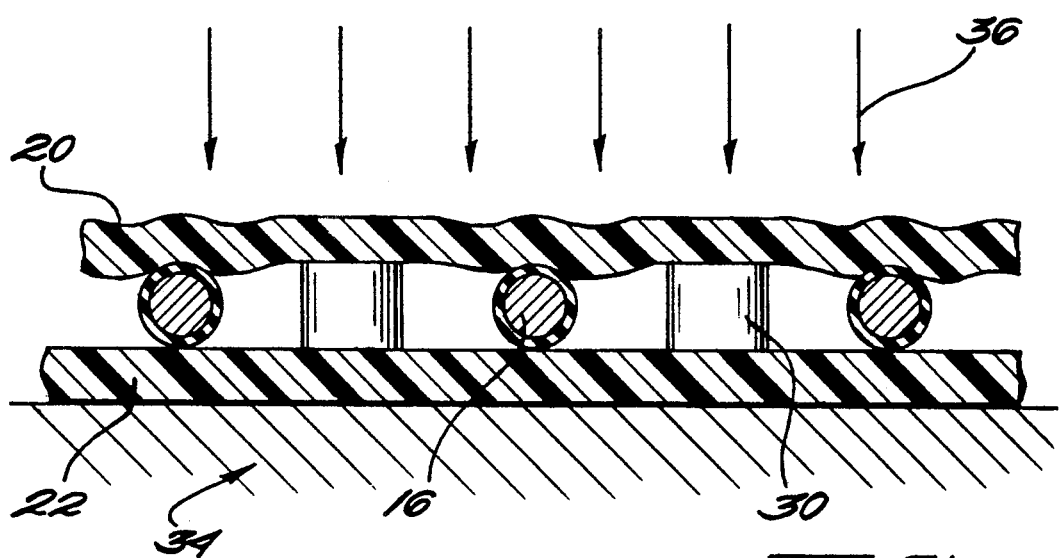
FIG. 3b is a cross-sectional view of a surface furnished with a flexible coating as shown in FIG. 3a subjected to external pressure.

In use, coating 24 is attached to a rigid surface 34 such as a wall, an aircraft wing, a flight of steps, or the interior of a process tank. Coating 24 conforms to the shape of surface 34, so layers 20 and 22 are approximately parallel, as seen in FIG. 3a. Uniform pressure 36 against outer layer 20 compresses the air or other filling 26 in cells 18 more than it compresses strands 12 or members 30, variably compressing and expanding substrate 10 and thereby flexing outer layer 20, as shown in FIG. 3b. Inner layer 22, attached to surface 34, is undisturbed. This flexing of layer 20 breaks away any adhering surface deposits before a crust can form, or cracks and splits away a crust which has already formed. As an example of use, such a coating applied to the skin of an aircraft would be flexed slightly but constantly during flight by air turbulence or pressure changes. At high altitudes, ice forming on the skin of the aircraft would constantly be broken away by the flexing action, preventing buildup. Since icing contributes to a large proportion of air crashes, this one application could potentially save many lives every year.

It will be apparent to those skilled in the art that many changes and substitutions can be made to the preferred embodiment herein described without departing from the spirit and scope of the present invention as defined by the appended claims.

What is claimed is:

1. A multilayer protective flexible laminate for preventing the build-up of solids deposited on a surface, said laminate comprising:
   a flexible outer layer; and
   a flexible substrate composed of a multiplicity of strands and open cells, said substrate having an outer side and an inner side, said outer side of said substrate bonded to said outer layer and said substrate having zone to zone variation in compressibility by varying the composition of one or more cells in each of said zone in said substrate for varying the compressive strengths of adjacent zones of said substrate so that, as said solids are deposited on said substrate, said substrate flexes thereby preventing said solids from building up on said surface.

2. The laminate as recited in claim 1, wherein said cells have a depth and a diameter, said diameter being greater than said depth.

3. The laminate as recited in claim 1, wherein said outer layer is a non-stick material.

4. The laminate as recited in claim 1, wherein said outer layer is pigmented.

5. The laminate as recited in claim 1, further comprising a flexible inner layer having an outer side and an inner side, said outer side of said inner layer bonded to said inner side of said substrate and said inner side of said inner layer engaging said surface.

6. The laminate as recited in claim 1, further comprising:
   a flexible inner layer having an outer side and an inner side, said outer side of said inner layer bonded to said inner side of said substrate; and
   a pressure-sensitive adhesive layer bonded to said inner side of said inner layer for adhering said laminate to said surface.

7. The laminate as recited in claim 1, wherein said cells have a depth and a diameter, said diameter being greater than said depth, and said laminate further comprising a flexible inner layer having an outer side and an inner side, said outer side of said inner layer bonded to said inner side of said substrate and said inner side of said inner layer engaging said surface.

8. The laminate as recited in claim 1, wherein said cells have a depth and a diameter, said diameter being greater than said depth, and said laminate further comprising:
   a flexible inner layer having an outer side and an inner side, said outer side of said inner layer bonded to said inner side of said substrate; and
   a pressure-sensitive adhesive layer bonded to said inner side of said inner layer for adhering said laminate to said surface.

9. The laminate as recited in claim 1, wherein said outer layer is a non-stick material, and said cells have a depth and a diameter, said diameter being greater than said depth, and said laminate further comprising:
   a flexible inner layer having an outer side and an inner side, said outer side of said inner layer bonded to said inner side of said substrate; and
   a pressure-sensitive adhesive layer bonded to said inner side of said inner layer for adhering said laminate to said surface.

10. The laminate as recited in claim 1, wherein said zone to zone variation further comprises noncompressible members placed in a portion of cells of said multiplicity of cells.

11. The laminate as recited in claim 1, wherein said zone to zone variation further comprises compressible members placed in a portion of cells of said multiplicity of cells.

12. The laminate as recited in claim 1, wherein said zone to zone variation further comprises compressible members placed in a first portion of cells of said multiplicity of cells and noncompressible members placed in a second portion of said multiplicity of cells.

* * * * *